United States Patent [19]

Wahl

[11] 4,054,195
[45] Oct. 18, 1977

[54] ROLLER CONVEYOR

[75] Inventor: John F. Wahl, Sterling, Ill.

[73] Assignee: Mallard Manufacturing Corporation, Sterling, Ill.

[21] Appl. No.: 578,368

[22] Filed: May 19, 1975

[51] Int. Cl.² .............................................. B65G 13/00
[52] U.S. Cl. .................................................... 193/35 R
[58] Field of Search ............................. 193/35, 36, 37; 198/127 R, 780, 860; 29/116 R, ; 214/84; 308/20; 113/116 R, 116 A, 116 G, 116 H, 116 HA, 116 QA, 116 V, 116 Y, 116 Z

[56] References Cited

U.S. PATENT DOCUMENTS

| 1,028,589 | 6/1912 | Moore | 193/35 R |
|---|---|---|---|
| 1,292,799 | 1/1919 | Kendall | 308/20 X |
| 1,881,896 | 10/1932 | Olson | 308/20 |
| 1,929,742 | 10/1933 | Hedlund | 113/116 G |
| 2,696,283 | 12/1954 | Barry | 193/35 R |
| 2,831,244 | 4/1958 | Adell | 113/116 HA X |
| 2,983,352 | 5/1961 | De Flora et al. | 193/37 X |
| 3,209,879 | 10/1965 | Wahl | 193/35C |
| 3,269,502 | 8/1966 | Kornylak | 193/35 R |
| 3,586,142 | 6/1971 | Inwood et al. | 193/37 X |
| 3,726,376 | 4/1973 | Gotham et al. | 193/35 R |
| Re. 14,792 | 1/1920 | Buck | 308/20 |

Primary Examiner—John J. Love
Assistant Examiner—James L. Rowland

[57] ABSTRACT

A roller conveyor which includes a channel with upwardly extending sides, the upper portions of the sides being turned outwardly to form a loop with the edges thereof next to the outside of the channel sides. The rollers are mounted on shafts of which one end extends through an opening on one channel side and the other end extends through an opening in the other channel side, and the edges of the turned-about portions overlie the ends of the shaft to lock the shaft in place.

9 Claims, 4 Drawing Figures

U.S. Patent  Oct. 18, 1977  4,054,195
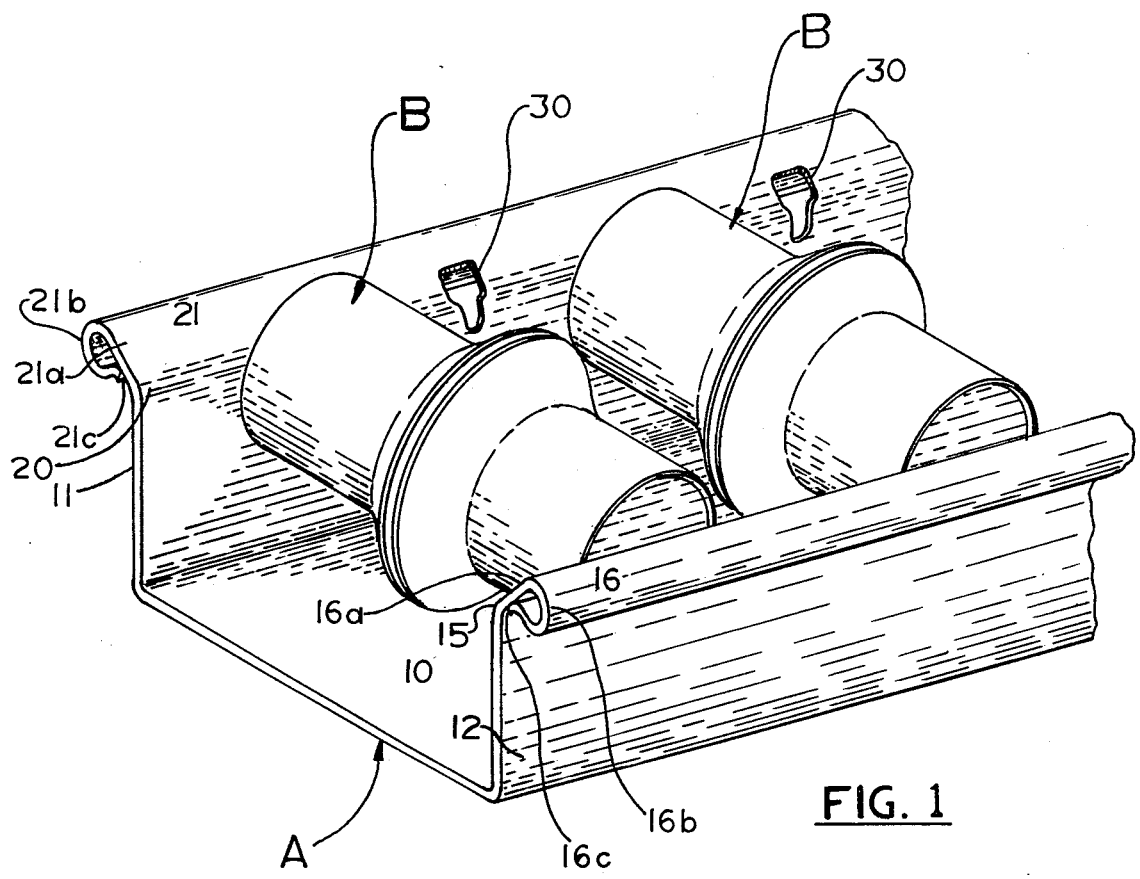
FIG. 1
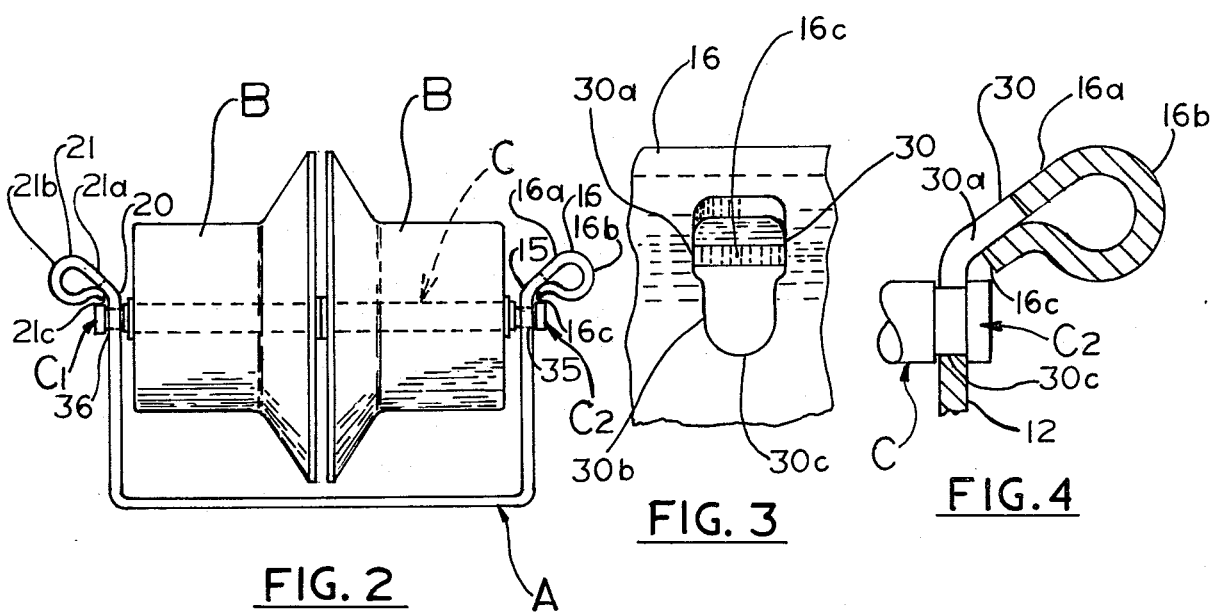
FIG. 2
FIG. 3
FIG. 4

ROLLER CONVEYOR

This invention pertains to a conveyor of the type which contains rollers on which articles may be placed so that the articles can be moved from place to place on top of the rollers.

BACKGROUND

For conveying boxes and other articles from place to place in industrial plants, it has been found convenient to provide channel irons in which rollers are mounted. The channel irons may be placed in parallel relationship along a path in which the articles are desired to be moved. The boxes or other articles may be placed on top of the rollers and pushed or allowed to move by gravity on top of the rollers to the place where they may be wanted.

The roller conveyors heretofore available have commonly consisted of a metal channel which is U-shaped in cross section with each side extending upwardly and being provided with spaced slots which extend downwardly from the top edge of the side members and which hold the ends of the shafts. The rollers extend transversely of the sides and have shafts extending through their axial centers with one end portion of the shaft being received in a slot in one side and the other end portion of the shaft being received in a slot in the other side. Such a roller conveyor is described in my U.S. Pat. No. 3,209,879.

A difficulty with the roller conveyors above described is that the rollers may be bumped or pushed in such a way that an end of the shaft may pop out of its slot in the side member and rest on the top of the side member. Even one roller out of place presents an obstruction to packages moving over the conveyor and this may disrupt the flow of material in a plant.

I have therefore set about to provide a roller conveyor structure which will avoid the accidental displacement of the rollers within the channel irons. At the same time I want to provide a structure which is simple, easy to assemble and when the occasion demands, will permit intentional removal of the rollers from the channel iron. Other objects and advantages of the improved structure will be apparent as this specification proceeds.

One embodiment of my invention is illustrated in the accompanying drawings in which:

FIG. 1 is a perspective view of the improved roller conveyor;

FIG. 2 is an end view of the conveyor;

FIG. 3 is a detailed view showing the opening in a channel side, as seen from the inside of the channel side; and FIG. 4 is a detailed longitudinal vertical sectional view of the edge portion of a channel side which has been formed into a loop.

As illustrated, the improved conveyor includes the channel A and rollers B which by means of the shaft C are mounted transversely within the channel iron and may rotate about the shaft.

The channel A includes a bottom plate 10, a left channel side 11 and a right channel side 12.

The rollers B extend with their longitudinal axes transverse with the plane of the sides. These rollers may take any suitable form. Two rollers B are included in the embodiment as shown in the drawing, their axes being aligned, and each having flanges 12 which are intended to serve as guides for packages or other articles moving along the top of the rollers. Only one or any number of such rollers may be included and may be axially aligned and they may be provided with guide flanges of various kinds or may have no such flanges.

The rollers are axially mounted on cylindrical shaft C about which they may rotate.

Referring now more particularly to the side 12 of channel A shown in FIG. 1, this side extends straight upwardly from the bottom 10 to the point designated 15. (See also FIGS. 2 and 4.) The portion of the side member 12 beyond point 15 will be called the top portion 16 of the side. This top side portion is turned outwardly from the slanting portion $16_a$, and then is further turned to form a loop $16_b$, and the edge $16_c$ of portion 16 lies against the outside surface of side 12 and overlies the right end $C_1$ of shaft C. The channel side 11 is constructed similarly to the channel side 12 and extends upwardly from bottom 10 to the point 20, then the top portion 21 is turned outwardly to form a slanting portion $21_a$ and a loop portion $21_b$ with the edge $21_c$ lying next to the outside of the channel side 11.

Spaced openings 30 are contained in each of channels sides 11 and 12, and these openings are illustrated more clearly in FIG. 3. Each of these openings take the general form of a slot having an upper part $30_a$ and a lower part $30_b$, the upper part $30_a$ being broader than the part $30_b$, and the lower edge $30_c$ of the slot being rounded to form a seat for a cylindrical shaft. As more clearly shown in FIGS. 3 and 4, the openings 30 are located so that the edges $16_c$ and $21_c$ are at an intermediate level between the top and the bottom of the openings (see FIG. 3). FIG. 1 shows unused openings between the rollers B. These additional openings are provided for use when the rollers B are to be mounted closer together, and are identical with the openings utilized by the rollers B.

To assemble the improved structure the shafts C are passed axially through the centers of the rollers. I should mention that each of shafts C is provided with an annular groove 35 which is spaced inwardly from the right end of the shaft and an annular groove 36 which is spaced inwardly from the left end of the shaft. The bottom of these grooves is cylindrical and of a size to fit into the lower part of the openings 30. To place the rollers and shafts in position, the roller, with the shaft extending through it, may be moved from a position above the channel A directly downwardly causing each end of the shaft to move through the upper parts of the openings 30 and continue moving downwardly with the grooves 35 and 36 engaging the side edges of the lower portions $30_b$ of the openings 30, and with the bottom of the grooves 35, 36 resting upon the curved bottom of the lower portion $30_c$ of the openings.

As the ends of the shaft move downwardly they encounter the edges $16_c$ and $21_c$, but due to the duplicate construction and the resiliency of the metal from which the channel structure is made, these edges are pushed sidewise to allow the ends of the shaft to pass, and after the shaft ends have passed, will then come back into a position overlying the shaft ends.

When the shafts have been moved into place as above explained and the edges of the upper portions of the sides move back into a position in which they overlie the shaft ends, it will be apparent that the shaft is locked in position. It cannot move upwardly because of the edges $16_c$ and $21_c$, and since the ends $C_1$ and $C_2$ of the shaft are larger than the width of the part $30_b$ of the slot, it cannot move transversely through the slot.

An advantage of my improved structure is that the rolled-over top edge of the sides presents a rounded smooth top surface avoiding the sharp top edges which are a safety hazard and are responsible for cuts and scratches. Futher, the rolled-over edge makes a much stronger structure in that it provides reinforcing support at the top edges of the channel sides. Also the improved structure is stronger by reason of avoiding the notches openings at the top edges of the channels which was a feature employed in many prior structures. Thus the improved structure not only provides a lock against accidental removal of the rolls but also strengthens the structure and makes for improved safety in the plant.

If it should be desired to remove a roller from the channel, this may be accomplished by taking a tool and pushing or prying the edges $16_c$ and $21_c$ outwardly sufficiently to allow the ends to move upwardly past these edges.

While only a single embodiment of the invention has been illustrated and described, it will be understood that many changes may be made and many embodiments constructed, all within the spirit of the invention and within the scope of the appended claims.

I claim:

1. In a roller conveyor which includes a shaft, a roller rotatably mounted on said shaft and a frame which carries said shaft, the improvement comprising a side member which forms a part of said frame, the upper portion of said member being turned to form a loop, a vertically elongated opening in said member, said opening being of a size sufficient to receive the end of said shaft through the upper part of the opening and to permit downward movement of said shaft into the lower part of said opening, the edge of said upper portion being inward of the extreme end of the shaft, the upper part of said opening being above said edge and the lower part of said opening being below said edge, said upper portion of said member being resilient whereby when said end of the shaft is received into the upper part of said opening and moved downwardly said upper portion of said member will yield to permit said end of the shaft to pass by said edge and move into said lower part of said opening and then said edge will move back to a position overlying said shaft end to lock said shaft end against movement upwardly beyond said edge.

2. A roller conveyor device as set forth in claim 1 in which said shaft has a groove spaced inward of one end of the shaft and in which said groove is engaged by the bottom of said opening in said one side whereby the shaft is restrained from longitudinal movement in said sides 3. A roller conveyor as set forth in claim 1 in which said one opening is in the form of a slot, the edge of said side being resilient and disposed intermediate between the top and bottom of said side opening, whereby said one end of said shaft may be passed through said upper portion and downwardly past said edge into a position in which said shaft is engaged by the lower portion of said slot and said edge overlies said one end of the shaft.

4. A roller conveyor as set forth in claim 3 in which said shaft has an annular groove spaced inwardly from said one end thereof and wherein said groove is engaged by the walls of said lower portion of said slot when in said position.

5. A roller conveyor as set forth in claim 3 in which the resiliency of said edge of said side permits it to be moved outwardly to permit said one end of said shaft to be moved upwardly past said edge to remove said one end through said upper part of said opening.

6. A roller conveyor as set forth in claim 3 in which an upper part of said slot extends upwardly into the turned part of said edge portion whereby said one end of said shaft may be moved downwardly through said upper part of said slot and into engagement ith the lower part of said slot.

7. A roller conveyor as set forth in claim 6 in which the resiliency of said edge of said side permits it to be moved outwardly whereby said one end may be moved upwardly past said edge and upwardly through said upper portion of said slot to remove it from engagement with said one side.

8. A roller conveyor as set forth in claim 1 wherein the upper edge portion of each of said sides is turned outwardly to form a loop and wherein the edges of said sides overlie the ends of said shaft to lock both ends in place within said opening.

9. A roller conveyor as set forth in claim 8 in which said shaft has an annular groove spaced inwardly of each end thereof and wherein each of said grooves engages the bottom side of one of said openings.

* * * * *